(12) United States Patent
Whitely et al.

(10) Patent No.: US 12,495,174 B2
(45) Date of Patent: Dec. 9, 2025

(54) SYSTEMS, METHODS, AND DEVICES FOR HOUSEHOLD CLASSIFICATION

(71) Applicant: Comcast Cable Communications, LLC, Philadelphia, PA (US)

(72) Inventors: Christopher Paul Whitely, Summit, NJ (US); Zhao Xing, Livingston, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 19 days.

(21) Appl. No.: 18/397,715

(22) Filed: Dec. 27, 2023

(65) Prior Publication Data
US 2025/0220259 A1    Jul. 3, 2025

(51) Int. Cl.
H04N 21/25    (2011.01)
H04N 21/24    (2011.01)

(52) U.S. Cl.
CPC ....... *H04N 21/252* (2013.01); *H04N 21/2407* (2013.01)

(58) Field of Classification Search
CPC .......................... H04N 21/252; H04N 21/2407
See application file for complete search history.

(56) References Cited

U.S. PATENT DOCUMENTS

| | | | |
|---|---|---|---|
| 6,470,378 B1 * | 10/2002 | Tracton | H04L 63/0407 709/235 |
| 7,240,355 B1 * | 7/2007 | Eldering | H04N 21/84 348/E5.002 |
| 10,397,659 B1 * | 8/2019 | Ling | H04N 21/4334 |
| 10,708,654 B1 * | 7/2020 | Moraghan | H04N 21/4532 |
| 2002/0129368 A1 * | 9/2002 | Schlack | H04N 21/44016 348/E7.071 |
| 2010/0211439 A1 * | 8/2010 | Marci | H04N 21/4662 705/7.29 |
| 2011/0314495 A1 * | 12/2011 | Zenor | G06Q 30/0242 725/34 |
| 2012/0260278 A1 * | 10/2012 | Lambert | H04H 60/66 725/9 |
| 2014/0259038 A1 * | 9/2014 | Belyaev | H04N 21/4667 725/14 |
| 2014/0259040 A1 * | 9/2014 | Han | H04N 21/25875 725/14 |
| 2015/0193822 A1 * | 7/2015 | Han | G06Q 30/0255 705/14.53 |
| 2015/0229979 A1 * | 8/2015 | Wood | H04N 21/4663 725/14 |
| 2016/0094883 A1 * | 3/2016 | Tidwell | H04N 21/812 725/109 |

(Continued)

*Primary Examiner* — Fernando Alcon
(74) *Attorney, Agent, or Firm* — BakerHostetler

(57) ABSTRACT

A group of households associated with known content viewing behavior may be determined. The group of households may be compared to at least one household with unknown content viewing behavior, based on a plurality of characteristics. Based on the comparison, a subset of the group of households that is associated with characteristics most similar to characteristics associated with the at least one household with unknown viewing behavior may be determined. A predicted content viewing behavior associated with the at least one household with unknown content viewing behavior may be determined based on the known content viewing behavior of the subset of the group of households.

20 Claims, 10 Drawing Sheets

(56) References Cited

U.S. PATENT DOCUMENTS

| | | | |
|---|---|---|---|
| 2016/0165277 A1* | 6/2016 | Kirillov | H04N 21/25891 |
| | | | 725/14 |
| 2016/0249098 A1* | 8/2016 | Pecjak | H04N 21/44224 |
| 2017/0006342 A1* | 1/2017 | Nagaraja Rao | H04N 21/4667 |
| 2017/0064358 A1* | 3/2017 | Sullivan | H04N 21/44226 |
| 2019/0058917 A1* | 2/2019 | Orlowski | H04N 21/44204 |
| 2019/0116392 A1* | 4/2019 | Vinson | H04N 21/258 |
| 2020/0053405 A1* | 2/2020 | Li | H04N 21/44204 |
| 2021/0258654 A1* | 8/2021 | Kurzynski | H04N 21/252 |
| 2023/0032845 A1* | 2/2023 | Atai | H04N 21/25883 |

\* cited by examiner

300

| Target LUID | Household ID | distance | hh_in | State |
|---|---|---|---|---|
| 1232731229 | 0000000001 | 2.8 | Smart TV | CA |
| 1232731229 | 0000000002 | 3.2 | STB | CA |
| 1232731229 | 0000000003 | 3.2 | STB | CA |
| 1232731229 | 0000000004 | 3.2 | Smart TV | CA |
| 1232731229 | 0000000005 | 3.2 | STB | CA |
| 1232731229 | 0000000006 | 3.2 | STB | CA |
| 1232731229 | 0000000007 | 3.3 | STB | CA |
| 1232731229 | 0000000008 | 3.3 | STB | CA |
| 1232731229 | 0000000009 | 3.3 | Smart TV | CA |
| 1232731229 | 0000000010 | 3.3 | STB | CA |
| 1232731229 | 0000000011 | 3.3 | STB | CA |
| 1232731229 | 0000000012 | 3.3 | STB | CA |
| 1232731229 | 0000000013 | 3.3 | Smart TV | CA |
| 1232731229 | 0000000014 | 3.3 | STB | CA |
| 1232731229 | 0000000015 | 3.3 | Smart TV | CA |
| 1232731229 | 0000000016 | 3.3 | Smart TV | CA |
| 1232731229 | 0000000017 | 3.3 | STB | CA |
| 1232731229 | 0000000018 | 3.3 | STB | CA |
| 1232731229 | 0000000019 | 3.5 | STB | CA |
| 1232731229 | 0000000020 | 3.5 | Smart TV | CA |

Columns: 302 Target LUID, 304 Household ID, 306 distance, 308 hh_in, 310 State

|  | '0' | '1' | '2-3' | '4-6' | '7-10' | '11-15' | '15+' |
|---|---|---|---|---|---|---|---|
| 1 Device | 73.2% | 7.3% | 6.9% | 4.7% | 3.0% | 1.8% | 3.2% |
| STB (All Devices) | 42.9% | 9.4% | 12.0% | 10.6% | 8.1% | 5.6% | 11.4% |

(a)

402

| Devices | Households | % Total | Weight | US % of TVs per HH, Statistica, 2015 |  |
|---|---|---|---|---|---|
| 1 | 3,038,522 | 88.0% | 0.30 | 1 | 26.1% |
| 2 | 361,568 | 10.5% | 3.24 | 2 | 33.9% |
| 3+ | 52,276 | 1.5% | 26.42 | 3+ | 40.0% |
|  | 3,452,366 |  |  |  |  |

(b)

|  | '0' | '1' | '2-3' | '4-6' | '7-10' | '11-15' | '15+' |
|---|---|---|---|---|---|---|---|
| Weighting by Device | 49.8% | 9.7% | 11.1% | 9.0% | 6.5% | 4.4% | 9.5% |

| Household ID | Probability |
|---|---|
| 0000000021 | 4.3% |
| 0000000022 | 4.3% |
| 0000000023 | 5.2% |
| 0000000024 | 5.2% |
| 0000000025 | 6.9% |
| 0000000026 | 1.9% |
| 0000000027 | 3.6% |
| 0000000028 | 26.2% |

FIG. 7

SYSTEMS, METHODS, AND DEVICES FOR HOUSEHOLD CLASSIFICATION

BACKGROUND

Household addressable media networks, such as cable and satellite television networks, allow network operators to provide specific content to target household segments. For example, an advertiser may be able to send one version of a supplemental content item (e.g. an advertisement) to a first segment of households and a different version of the supplemental content item to a second segment of households. However, household addressable media networks may not have access to data associated with a large number of households. If a household addressable media network does not have access to data associated with a large number of households, it may be difficult for the household addressable media network to determine which segment(s) each of these households belongs to. Therefore, improvements in household classification techniques are needed.

SUMMARY

Systems, methods, and devices relating to household classification are described herein. A group of households associated with known content viewing behavior may be determined. The known content viewing behavior may indicate, for example, types of content and/or quantities of content that each household in the group consumes. The group of households may be compared to at least one household with unknown content viewing behavior. The comparison may be made based at least on a plurality of features (i.e., characteristics). A subset of the group of households may be determined based on the comparison. The subset of the group of households may comprise households from the group of households that are associated with features (i.e., characteristics) most similar to features (i.e., characteristics) associated with the at least one household with unknown viewing behavior. Based on the known content viewing behavior of the subset of the group of households, a predicted content viewing behavior associated with the at least one household with unknown viewing behavior may be determined.

Data indicative of a group of households associated with a segment (e.g. household segment) may be received. The group of households associated with the segment may be compared to a group of other households. The group of other households may not be associated with a known segment. The comparison may be made based at least on a plurality of features (i.e., characteristics). A probability that each household of the group of other households is associated with the segment may be determined based on the comparison.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices:

FIG. 3 shows an example household classification table.
FIG. 4 shows example household device weighting tables.
FIG. 7 shows an example household classification table.

Aspects of the disclosure will now be described in detail with reference to the drawings, wherein like reference numbers refer to like elements throughout, unless specified otherwise.

DETAILED DESCRIPTION

Figure 1:
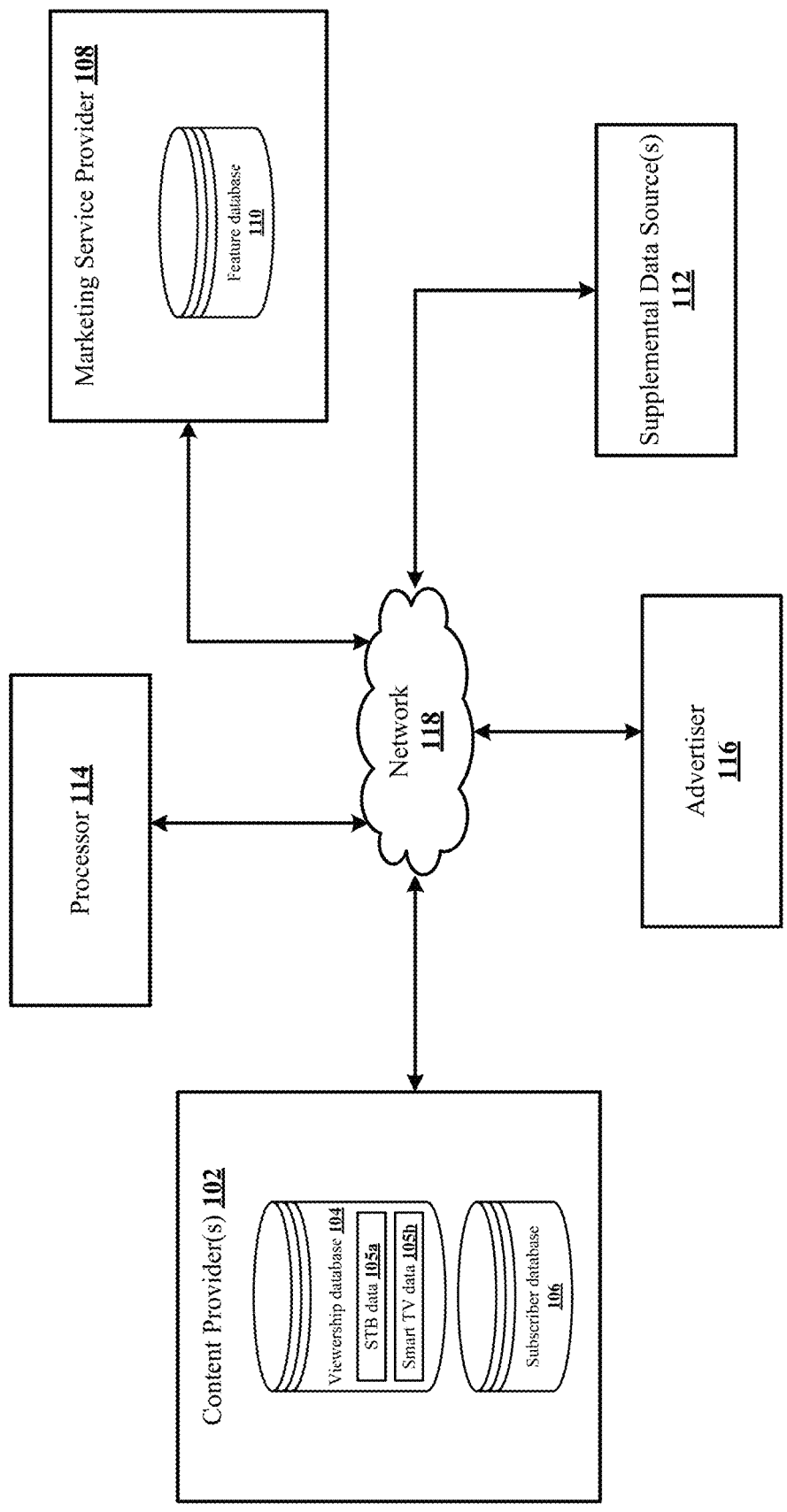
FIG. 1 shows a system.

Addressable advertising may be a highly effective form of advertising. For example, addressable advertising allows an advertiser to show different supplemental content items (e.g. advertisements) to different households while they are watching the same primary content item, such as a television show. Addressable advertising may be used to target specific household segments. A household segment may be a group of households that share at least one common feature (i.e., characteristic) or behavior. Non-limiting examples of household segmentation factors include age, gender, occupation, years of home ownership, household size, income, geographic location, family size, media consumption habits, and combinations thereof. Addressable supplemental content may be selected based on a household segment. For example, an addressable supplemental content item associated with a makeup product may be selected for output to a household segment that includes a group of households associated with teenage or adult females.

By targeting specific household segments, an advertiser may increase the likelihood that the end-viewer of the supplemental content item is actually interested in viewing the supplemental content. For example, the end-viewer of an addressable supplemental content item may be more likely to purchase or consume the goods or services being advertised by the supplemental content. By contrast, non-addressable advertising may be a less effective form of advertising. Non-addressable advertising may not be used to target specific household segments. For example, non-addressable advertising may show a generic supplemental content item to a large group of households, regardless of demographic information, identity, etc.

However, it may be difficult to determine which household segment(s) certain households belong to. For example, data associated with a large number of households (e.g. the majority of households in a city, state, country, etc.) may be unavailable. The data associated with a large number of households may be unavailable for a variety of reasons. For example, these unknown households may not be customers of the entity that wants to perform household segmentation. If data associated with a large number of households is unavailable, various features (i.e., characteristics) and/or behaviors associated with these households may be unknown—as a result it may be difficult to determine which household segment(s) these unknown households belong to. If these unknown households cannot be segmented, it may be difficult to determine addressable supplemental content for these households.

Accordingly, it may be desirable to determine which household segment(s) these unknown households belong to. This may be accomplished by utilizing available household data. This available household data may indicate various features (i.e., characteristics) and/or behaviors associated with a particular set of households (e.g. known households). Based on the available household data, similarities between the known households and the unknown households may be determined. These determined similarities may be used to determine one or more household segment(s) to which these unknown households belong. Determining one or more household segment(s) to which these unknown households belong may enable the determination of addressable supplemental content for these households.

FIG. 1 shows an example system in which the present systems, methods, and devices may be implemented. As shown in FIG. 1, a system 100 may comprise at least one content provider 102, a marketing service provider 108, at least one supplemental data source 112, an advertiser (e.g. advertiser network) 116, and a processor 114. The at least one content provider 102, the marketing service provider 108, the at least one supplemental data source 112, the advertiser (e.g. advertiser network) 116, and the processor 114 may be in communication via a network 118.

The content provider 102 may distribute content to households and/or user devices. Non-limiting examples of a content provider 102 include a television broadcast network, a cable television network, a satellite television network, an internet service provider (ISP), a computing device advertising network, a media distribution network, a cloud computing network, a local area network (LAN), a wide area network (WAN), or any combination thereof. The content provider 102 may transmit content to one or more local content systems configured to communicate with an audience (e.g. a plurality of households) of the system 100. The local content systems may include equipment and systems configured to transmit content received from the content provider to a defined portion of the audience (e.g. one or more defined household segments). Illustrative and non-restrictive examples of a local content system include a cable television network headend, an internet service provider base station, or the like.

The content transmitted by the content provider 102 may include one or more content items. A content item may comprise, as an example, a video program. A video program may refer generally to any video content produced for viewer consumption. A video program may comprise video content produced for broadcast via over-the-air radio, cable, satellite, or the internet. A video program may comprise video content produced for digital video streaming or video-on-demand. A video program may comprise a television show or program. A video program series may comprise two or more associated video programs. For example, a video program series may include an episodic or serial television series. As another example, a video program series may include a documentary series, such as a nature documentary series. As yet another example, a video program series may include a regularly scheduled video program series, such as a nightly news program.

The content transmitted by the content provider 102 may include supplemental content. Supplemental content may generally include any type of data capable of being received and consumed by a recipient. For example, supplemental content may include advertising, entertainment programs, informational programs, messages, video, audio, graphical, and/or animated content. The supplemental content may include, for example, one or more addressable (e.g. targeted) advertisements.

The supplemental content may be inserted into a stream of content transmitted by the content provider 102. For example, the supplemental content may be inserted into a supplemental content insertion opportunity (e.g. avail) in the stream of content. Such supplemental content insertion opportunities may be indicated by one or more supplemental content insertion markers inserted into the stream of content. The supplemental content insertion markers may be, for example, SCTE 35 markers in accordance with the American National Standards Institute (ANSI)/SCTE 35 standard. Additionally, or alternatively, the supplemental content insertion markers may be identified in XML with time codes associated with avail start and end times, and/or any other means of defining supplemental content insertion opportunity times.

The content provider 102 may comprise a content source. The content source may provide (e.g., transmit or deliver) content, such as video programs, to the one or more local content systems for delivery to the audience (e.g. households). The content source may comprise stored content, such as that anticipated to be delivered as digital streaming video, on-demand video, or cloud DVR recorded video. The content source may comprise content intended for immediate or near-immediate broadcast, such as a live television video feed. For example, the content source may comprise content that has not yet been broadcast or made available for digital video streaming or on-demand video delivery.

The content provider 102 and/or the local content systems may be configured to implement linear addressable systems, such as a linear addressable television advertising system. In a linear addressable system, content and/or supplemental content may be targeted to individual user devices, such as STBs, home gateways, and/or DVRs, and/or specific households (e.g. households in a particular household segment) in a linear broadcast system.

The content provider 102 may be configured to operate across physical device platforms and networks simultaneously. For example, content may be delivered by the content provider 102 (such as via one or more local content systems) to set-top-boxes (STBs) and/or digital video recorders (DVRs) over a cable television system, to mobile computing devices using standard network communication protocols (for instance, Ethernet or Wi-Fi) over an ISP network, to smart devices over standard telecommunication protocols (for instance, third Generation (3G), fourth Generation (4G), long-term evolution (LTE), or the like), and to home gateway devices through a LAN, WAN and/or ISP network.

The content may be distributed by the content provider 102 to an audience. The audience may include households that each comprise one or more user devices capable of receiving content from the system 100 through various receiver devices. The plurality of user devices may comprise any one of numerous types of devices configured to effectuate content output (e.g. playback) and/or viewing. The plurality of user devices may be configured to receive content and output the content to a separate display device for consumer viewing.

Non-limiting examples of a user device include a set-top box (STB), such as a cable STB. A STB may receive video content via a cable input (e.g., co-axial cable or fiber optic cable) and format the received video content for output to a display device. A STB may receive video content via digital video streaming. A STB (or other type of video device) may comprise a quadrature amplitude modulation (QAM) tuner.

A STB may comprise a digital media player or a gaming device. A user device may comprise a digital video recorder (DVR) that receives and stores video content for later viewing. A user device may be in communication with a cloud DVR system to receive video content. A user device may comprise one or more of any other type of device, such as, and without limitation, a television, a smart television, a personal computer (PC), a laptop computer, a mobile computing device, a smartphone, a tablet computing device, a home gateway, or the like. A user device may combine any features or characteristics of the foregoing examples. For instance, a user device may include a cable STB with integrated DVR features.

The content provider 102 may comprise at least one database, such as one or more of the databases 104, 106. The one or more databases 104, 106 may each store data indicative of information associated with the audience of the content provider 102 (e.g. the households and/or user devices to which the content provider 102 distributes content).

The database 104 may store content viewership information associated with the audience. Content viewership information associated with the audience may indicate, for example, how much content and what type(s) of content each household in the audience consumes. For example, the content viewership information associated with the audience may indicate whether each household consumes linear content, non-linear content, content associated with a particular genre, and/or a supplemental content item (such as an advertisement that is part of an ad campaign). Linear content may include a live television program that airs on a particular channel at a scheduled time. Non-linear household content may include content distributed via broadband (e.g. internet), broadcast, and/or premium cable (e.g. pay-cable).

For example, the database 104 may store STB viewership information 105a. The STB viewership information may indicate which content and how much content that a household has consumed via its STB. The database 104 may additionally, or alternatively, store smart television data 105b. The smart television data 105b may indicate which content and how much content that a household has consumed via its smart television. The database 104 may store different content viewership data in addition to, or as an alternative to, the STB viewership information 105a and the smart television data 105b.

The content viewership information associated with the audience may additionally indicate how much of each type of content each household consumes. For example, the database 104 may store data indicative of a quantity of time (e.g. number of minutes, hours, etc.) that a household has spent watching one or more of linear content, non-linear content, content associated with a particular genre, and/or a supplemental content item.

The database 106 may store subscriber information associated with the audience. Subscriber information associated with the audience may include, for example, information about each household that receives content from the content provider 102, including what types of services (linear content, video-on-demand, etc.) each household subscribes to. Other subscriber information may include general information and/or demographic information, such as names, gender, age/date of birth, ethnicity, address/geographic location, any/or any other information that the content provider 102 collects from its audience or receives about its audience.

The marketing service provider 108 may collect and/or determine features (i.e., characteristics) associated with a large number of households and store it in a database, such as the feature database 110. A large number of features (i.e., characteristics), such as 800+ features, may be stored in the feature database. The features (i.e., characteristics) may fall into one or more of the following categories: dwelling type, behavior/activities, ethnicity, geography, net worth, household composition, discretionary spending, occupation, geography, income, and/or any other type of consumer category. The database 110 may indicate a large number of households and which feature(s) each household is associated with. The marketing service provider 108 may be unrelated to the content provider 102. For example, the marketing service provider 108 and the content provider 102 may be unrelated business entities.

The advertiser (e.g. advertiser network) 116 may select supplemental content for specific household segments based on information received from the content provider 102. For example, the advertiser 116 receive a request for a supplemental content item from a user device. The advertiser 116 may select items of addressable supplemental content for insertion into a supplemental content insertion opportunity by the user device based on information associated with that user device. For example, the advertiser 116 may select items of addressable supplemental content based on one or more household segment(s) to which the user device belongs. As discussed above, households (and the user devices that associated with the households) may be divided into segments based on various segmentation factors. Non-limiting examples of segmentation factors include age, gender, occupation, years of home ownership, household size, income, geographic location, family size, media consumption habits, and combinations thereof. The advertiser 116 may select particular supplemental content items for only certain segments of households.

However, as discussed above, it may not be possible to select an addressable supplemental content item if information associated with that user device is not available. For example, it may not be possible to select an addressable item of supplemental content if it is not known to which household segment(s) the household associated with the user device belongs. Accordingly, it may be desirable to determine which household segment(s) these unknown households belong to.

The processor 114 may be configured to determine which household segment(s) these unknown households belong to. To determine which household segment(s) these unknown households belong to, the processor 114 may utilize available household data. This available household data may indicate various features (i.e., characteristics) and/or behaviors associated with a particular set of households (e.g. known households). Based on the available household data, similarities between the known households and the unknown households may be determined. These determined similarities may be used to determine one or more household segment(s) to which these unknown households belong. Determining one or more household segment(s) to which these unknown households belong may enable the determination of addressable supplemental content for these households.

The processor 114 may be configured to determine any type of household segment(s) to which unknown households belong. Non-limiting examples of categories of household segments include, but are not limited to, behavioral segments, psychographic segments, demographic segments, and/or geographic segments. Non-limited examples of behavioral segmentations include, but are not limited to, purchasing behavior, benefits sought (e.g. which benefits, features, use cases, or problems are most applicable to the household), buyer journey stage, product or service usage, customer loyalty, user status, etc. Non-limited examples of psychographic segmentations include, but are not limited to, habits, hobbies, activities, or interests, values or opinions, personality or attitude, lifestyle, social status, etc. Non-limited examples of demographic segmentations include, but are not limited to, occupation, marital status, political party status, race, religion, living status (homeowner vs. renter), etc. Non-limited examples of geographic segmentations include, but are not limited to, city, state, country, population density, economic status, zip code, regional climate, etc. There may be restricted segmentations that are not used. For example, religion may be one characteristic not used for segmentation, as well as certain activities, interests and values/opinions.

The processor 114 may be configured to determine one or more behavioral segments to which one or more unknown households belong. The one or more behavioral segmentations may include, for example, content viewing behavior segmentations. Content viewing behavior segmentations may include, for example, linear content consumers, non-linear content consumers, consumers associated with a particular genre, and/or consumers associated with viewership of a supplemental content item (such as an advertisement associated with an ad campaign).

The processor 114 may be configured to determine one or more content viewing segmentations that apply to an unknown household using content viewing data associated with known households. To determine one or more content viewing segmentations that apply to an unknown household, the processor 114 may receive, such as from the content provider 102, content viewing data associated with known households. The content viewing data associated with known households may include data stored in the database 104, such as the STB viewing data 105a and/or the smart television data 105b.

To determine one or more content viewing segmentations that apply to an unknown household, the processor 114 may utilize available feature (i.e., characteristic) information (not content viewing data) associated with both the unknown household(s) and the known households. The processor 114 may receive, such as from the marketing service provider 108, feature (i.e., characteristic) information. The available feature information may be determined and/or collected by a third-party, such as the marketing service provider 108. As discussed above, the marketing service provider 108 may collect and/or determine features associated with a large number of households (both unknown and known households) and store it in a database, such as the feature database 110. The features (i.e., characteristics) stored in the feature database 110 may be utilized by the processor 114 to determine one or more content viewing segmentations that apply to an unknown household.

For example, the processor 114 may compare each of the known households to at least one unknown household. To compare each of the known households to the at least one unknown household, the processor 114 may compare the features (i.e., characteristics) associated with the group of known households to the features (i.e., characteristics) associated with the at least one unknown household. To compare the features associated with the group of known households with the features associated with the at least one unknown household, the processor 114 may determine a similarity between the features associated with each of the known households and the features associated with the at least one unknown household. The similarity may be, for example, a distance (e.g. Euclidean distance, cosine similarity distance), with a smaller distance between features being indicative of a greater similarity.

Based on the comparison, the processor 114 may determine a plurality of known households that are most similar (feature-wise) to the at least one unknown household. For example, the processor 114 may determine a subset of the group of known households that includes those known households associated with features that are the smallest distance away from the features associated with the at least one unknown household. The subset of the group of known households may include any number of households, such as the twenty (or another any number) known households that are most similar, feature-wise, to the at least one unknown household.

Figure 2:
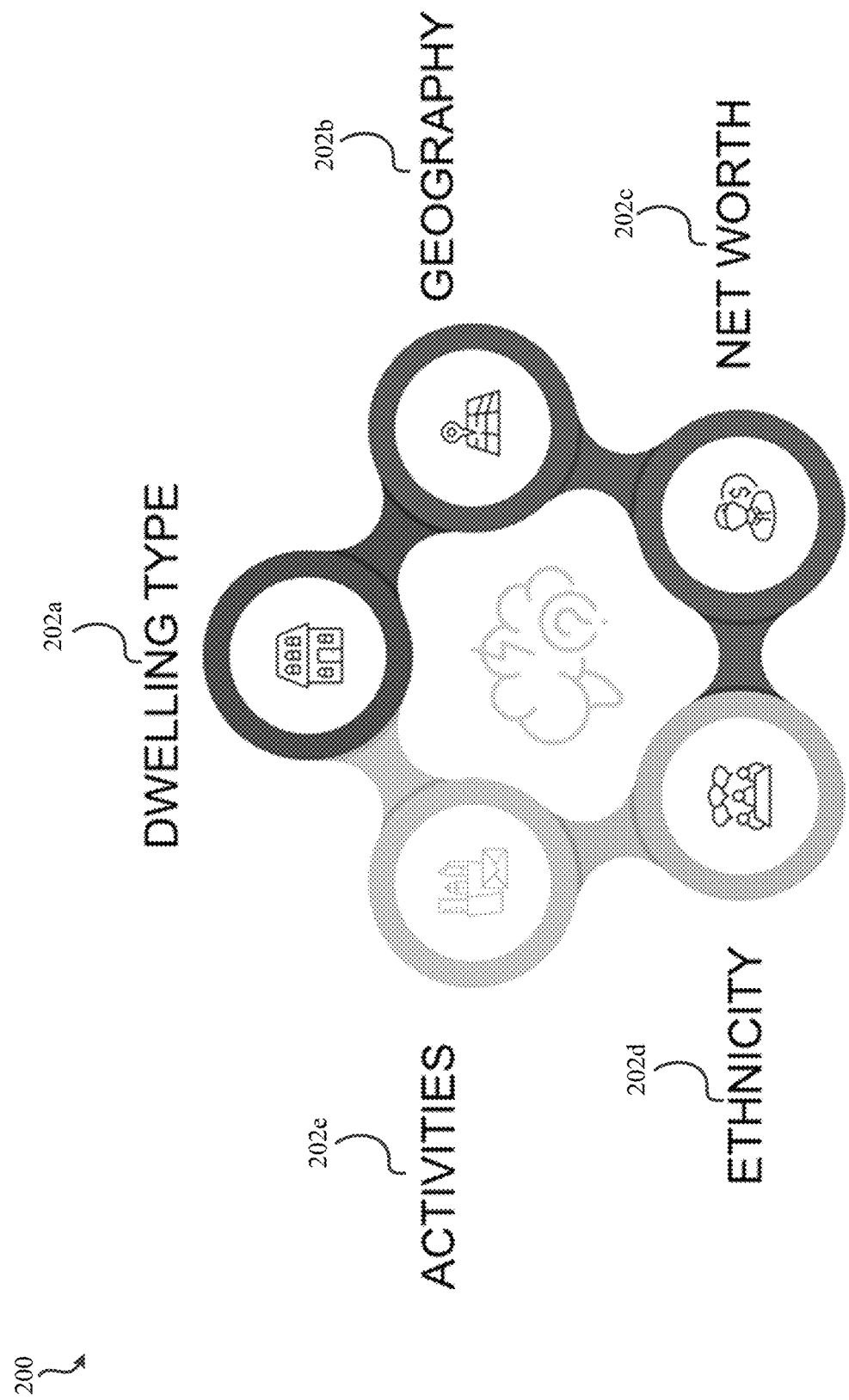
FIG. 2 shows an example set of feature groupings.

The features (i.e., characteristics) that the processor 114 uses in the comparison may be those features that are most indicative of content viewership behavior. FIG. 2 shows an example set of feature (i.e., characteristic) classifications 200. The set of feature classifications 200 indicates categories of features 202a-e that the processor 114 may use to determine one or more content viewing segmentations that apply to an unknown household. These categories may include those features categories that are most indicative of content viewership behavior. For example, the categories may include dwelling type 202a, geography 202b, net worth 202c, ethnicity 202d, and/or activities/behavior 202e. The subset of the group of known households determined by the processor 114 may include those known households that are the most similar in terms of dwelling type, activities/behavior, geography, net worth, and/or ethnicity to the at least one unknown household. The subset of known households may each be associated with the same geographic region as the unknown household. For example, the subset of known households may each be associated with the same zip code, county, city, or state as the unknown household.

FIG. 3 shows an example household classification table 300. The table 300 shows a subset of known households that are most similar (feature-wise) to an unknown household. The subset of known households may be determined, for example, by the processor 114. The first column 302 indicates an identification number associated with an unknown household. The second column 304 includes the identification numbers of a subset of known households that are most similar (feature-wise) to the unknown household associated with the identification number indicating in column 302. The column 304 includes twenty identification numbers, but a larger or smaller number of known households may alternatively be included in the subset of known households. The known households indicated in column 304 may include those known households that are the most similar in terms of dwelling type, activities/behavior, geography, net worth, and/or ethnicity to the at least one unknown household indicated in column 302.

The column 306 indicates a distance between the features (i.e., characteristics) associated with the known household indicated in column 304 and the features associated with the unknown household in column 302. For example, the known household indicated in the first row of the column is most similar, feature-wise, to the unknown household because the distance is the smallest. The column 308 indicates which type(s) of content viewing data associated with the known household is available. For example, the column 308 may indicate whether STB viewing data (e.g. STB viewing data 105a) or smart television viewing data (e.g. smart television viewing data 105b) is available for the known household in that row. The column 310 indicates a geographic region associated with the unknown household indicated in column 302 and the known households indicated in column 304. As discussed above, the subset of known households may each be associated with the same geographic region as the unknown household. In the table 300, the subset of known households and the unknown household are each associated with the state "California."

Referring back to FIG. 1, the content viewing behavior associated with each household of the subset of known households may be indicative of the content viewing behavior of the unknown household. However, the available content viewing behavior data associated with the known households (including the subset of known households) may not reveal the true amount of exposure that the known households have had to supplemental content items, such as advertisements that belong to a particular ad campaign. For example, only a portion of the content viewing behavior data associated with some known households may actually be available.

This may occur if content viewing behavior associated with only a portion of the devices in a known household is available. For example, the content provider 102 may only have access to content viewing behavior data associated with one device in a known household, but that known household may actually include two, three, or more devices. As a result, exposure to a supplemental content item may be undercounted, as a known household may have been exposed to the supplemental content item on a device for which content viewing behavior data is unavailable.

To remedy the issue of undercounting exposure to supplemental content items, the processor 114 may adjust the available content viewing behavior data associated with the known households. These adjustments may be made to ensure that the content viewing behavior data associated with the subset of known households may be used to more accurately predict whether an unknown household has been exposed to a supplemental content item. These adjustments, which may include weighting and/or calibration, may be made based at least in part on data associated with national content viewing behavior. This national data may be received by the processor 114 from any source, such as a supplemental data source 112. A weighting process and a calibration process than may be performed by the processor 114 are each discussed in more detail below.

For example, the processor 114 may determine and assign a weight to the different devices associated with the known households. FIG. 4 shows a set of example household device weighting tables 400. The set of example household device weighting tables includes table (a), table (b), and table (c). Table (a) shows the exposure level to supplemental content items associated with an ad campaign, as indicated by the content viewing data associated with known households. A "brand exposure level" of zero indicates that the household was not exposed to any supplemental content items associated with the ad campaign. Likewise, "brand exposure level" of one indicates that the household was not exposed to one supplemental content item associated with the ad campaign, and so on. The first row of table (a) indicates exposure level if content viewing data from just one device in a known household is available. The second row of table (a) indicates exposure level if content viewing data from all devices in a known household is available.

As shown in table (a), when content viewing data from just one device in a known household is available, the data indicates that 73.2% of households were not exposed to a supplemental content item. However, when looking at known households for which content viewing data from all devices in a known household is available, only 42.9% of households were not exposed to a supplemental content item. This reveals that the content viewing data associated with known households significantly undercounts exposure to supplemental content items. In other words, the content viewing data associated with known households significantly overcounts "zero-exposure" to supplemental content items. A scaling factor will not remedy this "zero-exposure" issue because it would multiply the scaling factor by zero exposures, still resulting in zero exposures. Additionally, high reach ad campaigns may be overcounting with a scaling factor.

Instead, weighting by device may solve this "zero-exposure issue." Weights for the devices in the unknown household may be determined using known, national household data. For example, the known, national household data may indicate which percentage of households in the country own one device, which percentage of households in the country own two devices, and which percentage of households in the country own three or more devices. Table (b), in the last column, indicates that 26% of households in the country have one device, 34% have two devices, and 40% have three or more devices. However, the third column of table (b) indicates that, according to the available data associated with the known households, 88% of the known households have one device, 10.5% have two devices, and 1.5% have three or more devices.

This national data may be used to generate a weight that increases the importance of the two and three plus device households in the data. For example, in column 402 of table (b), a weight is indicated for the one, two, and three plus device households. This weight may be determined based on the national data found in the last column of table (b). For example, 26.1% divided by 88% is equal to approximately 0.3, so the weight associated with one device households is equal to 0.3. The other weights in the column 402 may be calculated in a similar manner.

The generated weights may be applied to the known households. For example, a weight of 0.3 may be applied to the known households associated with a single device, a weight of 3.24 may be applied to the known households associated with two devices, and a weight of 26.42 may be applied to the known households associated with three or more devices, thereby increasing the importance of the two and three plus device households in the known household data. Applying the weights to the known household data may generate a supplemental content item exposure level that is more accurate than if the weighting process is not performed. For example, the table (c) indicates the supplemental content item exposure level associated with the known households post-weighting process. As shown in table (c), the new percentage of zero-exposures, 49.8%, is much closer to the 42.9% in the second column of table (a). Accordingly, weighting by device helps to eliminate or minimize the zero-exposure issue.

Referring back to FIG. 1, weighting alone may solve the zero-exposure issue if the processor 114 were only using the content viewing behavior associated with the known households to calculate aggregate reach numbers. However, the processor 114 may determine more than just aggregate reach numbers associated with an ad campaign. For example, as discussed above, the processor 114 may also determine, based on the subset of known households, how much content of a particular type (e.g. linear, non-linear, genre, etc.) that the at least one unknown household likely consumes. To make such a determination, it may need to be determined, at a household level, how much of that type of content each known household likely consumes.

However, this may be difficult to determine due to an imbalance in the content viewing behavior data associated with the known households as compared to a national average. For example, the STB data 105a collected and stored by the content provider 102 may indicate that only 3% of households are broadcast content consumers and the smart TV data 105b collected and stored by the content provider 102 may indicate that 22% of households are broadcast content consumers. However, the true national number may be 14% (e.g. 14% of households in the country are broadcast content consumers). To remedy this imbalance, the processor 114 may calibrate the content viewing behavior data associated with the known households (e.g. data including the STB data 105a and the smart TV data 105b) so that it is in line with the national content viewing behavior data.

Figure 5:
FIG. 5 shows an example household device reassignment table.

To calibrate the content viewing behavior data associated with the known households, the processor 114 may assign known households with one known device to multiple device categories in alignment with the national distribution. FIG. 5 shows an example household device reassignment table 500. To calibrate the content viewing behavior data, two and three plus device known households may stay static (assume there are no more devices within these households). One device known households may be randomly assigned to a number of projected devices (1, 2 or 3+) to match the national population. If the number of projected devices is higher than the number of actual devices, a portion of devices may be randomly assigned from zero-exposure to non-zero exposure. This new non-zero population and all other levels of supplemental content exposure may be scaled to whole numbers using the assigned number of devices.

As described above, the processor 114 may determine one or more content viewing segmentations that apply to an unknown household using content viewing data associated with known households. The processor 114 may additionally, or alternatively, determine a probability that each of a plurality of unknown households belong to a particular "target" segment. For example, the processor 114 may receive, such as from an advertiser, a seed data set. The seed data set may indicate a group of households that each belong to a particular target segment. The target segment may be any household segment that the advertiser wants to target. The advertiser may want to identify additional unknown households that belong to the target segment. The additional unknown households may be unknown households in a particular geographic region, or they may be any unknown national household. For example, the seed data may indicate a group of households that are heavy mobile users, and the advertiser may want to identify other unknown households that are also heavy mobile users. Identifying other unknown households that fit into the target segment may allow the advertiser to serve supplemental content associated with the target segment to a large number of households-thus increasing the reach of a particular ad campaign.

The processor 114 may merge the seed data with data associated with known households, such as the subscriber data stored in the subscriber database 106. As discussed above, the subscriber data may indicate whether a known household subscribes to (and is therefore capable of receiving) a particular type of content (e.g. linear content, VOD content, etc.). Merging the seed data with the subscriber data may allow the processor 114 to determine which households in the seed data set are known households, and which type(s) of content these known seed households are capable of receiving. It is important to merge the seed data with the subscriber data so that the processor 114 is able to determine whether an unknown household is capable of receiving a particular type of content. For example, if the seed data indicates a group of households that are heavy mobile users and the advertiser wants to identify other unknown households that are also heavy mobile users so that they can serve a linear addressable supplemental content item to these unknown households, it is important than the processor 114 be able to determine which unknown households are actually capable of receiving linear addressable content.

The processor 114 may utilize the merged dataset (combination of seed data and subscriber data) to predict a probability that each of a plurality of unknown households belongs to the target segment. To predict whether an unknown household belongs to a particular segment, the processor 114 may utilize available feature (i.e., characteristic) information associated with both the unknown household(s) and the households in the merged dataset. As discussed above, the processor 114 may receive, such as from the marketing service provider 108, the feature information. The features (i.e., characteristics) may be utilized by the processor 114 to predict a probability that each of a plurality of unknown households belongs to the target segment.

For example, the processor 114 may compare each of the unknown households to the households in the merged dataset. To compare each of the unknown households to the households in the merged dataset, the processor 114 may compare the features (i.e., characteristics) associated with the unknown households to the features (i.e., characteristics) associated with the households in the merged dataset. To compare the features associated with the unknown households to the features associated with the households in the merged dataset, the processor 114 may determine a similarity between the features associated with the unknown households to the features associated with the households in the merged dataset. The similarity may be, for example, a distance (e.g. Euclidean distance, cosine similarity distance), with a smaller distance between features being indicative of a greater similarity.

Figure 6:
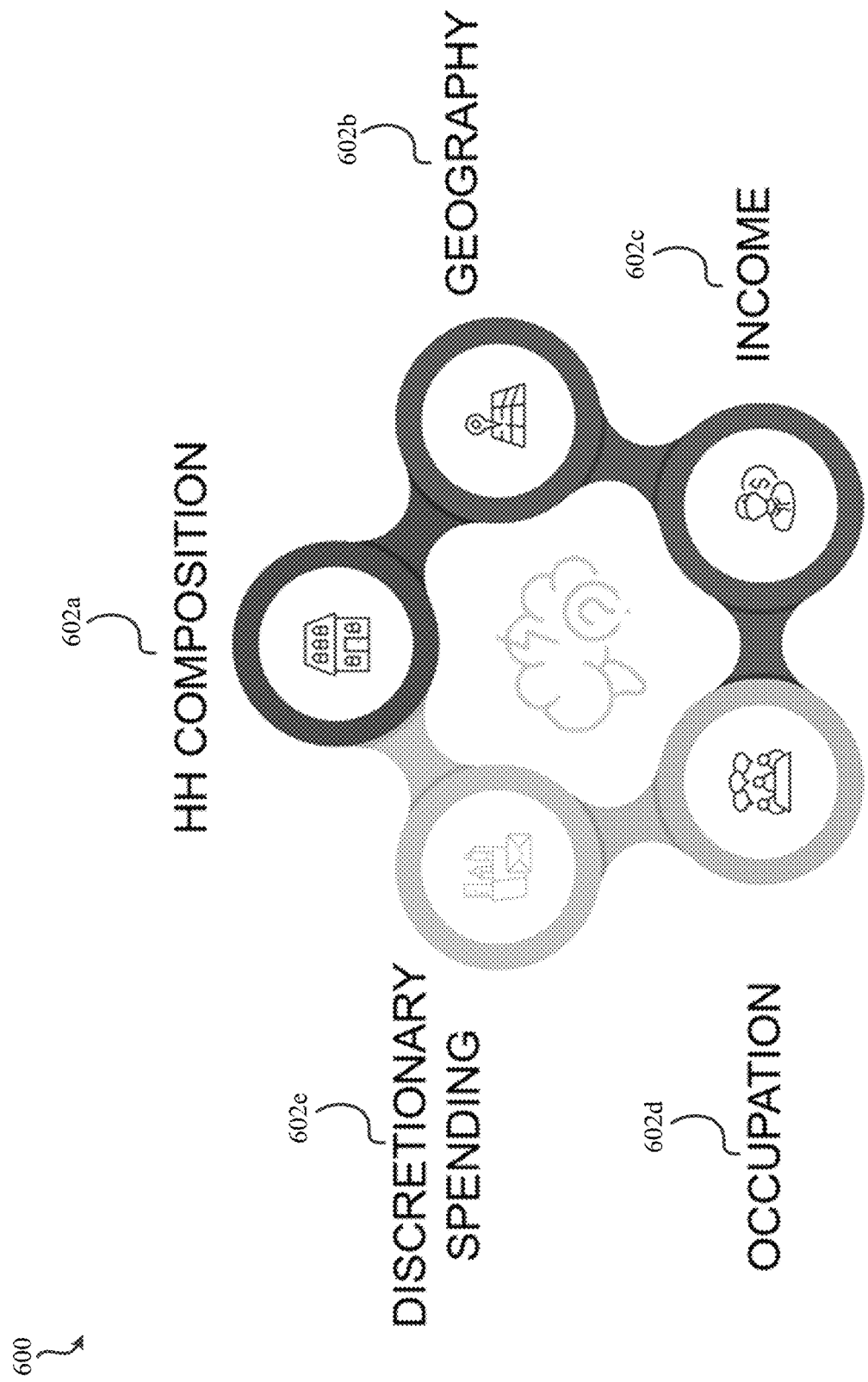
FIG. 6 shows an example set of feature groupings.

The features (i.e., characteristics) that the processor 114 uses in the comparison may include demographic features (i.e., characteristics). FIG. 6 shows an example set of feature (i.e., characteristic) classifications 600. The set of feature classifications 600 indicates categories of features 602a-e that the processor 114 may use to predict a probability that each of a plurality of unknown households belongs to the target segment. For example, the categories may include household composition 602a, geography 602b, income 602c, occupation 602d, and/or discretionary spending 602e. Different features may be more relevant depending on what the target segment is. For example, if the target segment is heavy mobile users, discretionary spending may be a huge predictor. However, for other target segments, discretionary spending may be less important. Accordingly, the processor 114 may use different features in its comparison depending on the target segment.

The processor 114 may classify, based on the comparison, the probability that each unknown household is a high prospect (likely to belong to the target segment), a medium prospect, or a low prospect (not likely to belong to the target segment). For each unknown household, the sum of the probability that the unknown household is a high prospect, the probability that the unknown household is a medium prospect, and probability that the unknown household is a low prospect may be equal to one. For each unknown household, the more similar the features (i.e., characteristics) are to the features (i.e., characteristics) associated with the households in the merged dataset, the greater probability that the unknown household is a high prospect. Similarly, for each unknown household, the less similar the features are to the features associated with the households in the merged dataset, the greater probability that the unknown household is a low prospect.

Whichever probability is greatest may indicate whether that unknown household belongs to the target segment. For example, if the probability that the unknown household is a high prospect is the greatest of the three prospects, then this may indicate that the unknown household likely belongs to the target segment. For example, unknown households determined by the processor 114 to likely belong to the target segment may be those unknown households that are the most similar to the households in the merged dataset in terms of household composition, geography, income, occupation, and/or discretionary spending.

The processor 114 may rank the unknown households in terms of how similar they are to the households in the merged dataset. FIG. 7 shows an example household classification table 700. Each row in the first column of the table 700 indicates an identification number associated with an unknown household. Each row in the second column of the table 700 indicates a probability that the unknown household identified in the corresponding row of the first column belongs to the target segment. For example, the first row in the table 700 corresponds to a first unknown household and the probability that this unknown household belongs to the target segment is 4.3%. Similarly, the last row in the table 700 corresponds to a second unknown household and the probability that this unknown household belongs to the target segment is 26.2%. The second unknown household is much more likely to belong to the target segment than the first unknown household.

The processor 114 may generate and output segment lists for one or more ventile criteria. For example, the processor 114 may generate and output one or more of a list of the top 95%-100% unknown households, a list of the top 90%-100% unknown households, a list of the top 85%-100% unknown households, a list of the top 80%-100% unknown households, a list of the top 75%-100% households, etc. For example, the list of the top 95%-100% unknown households may include those unknown households that have the highest probabilities of belonging to the target segment, as compared to the other unknown households. The processor 114 may forward the output list(s) to an advertiser. The advertiser may use the information contained in the list to gain a better insight into the potential reach of an ad campaign and/or viewership interest.

Optionally, the seed data received by the processor 114 may indicate important rankings associated with various households in the seed data. For example, the entity (such as the advertiser) that generated the seed data may have assigned a "high", "medium," or "low" importance to each household in the seed data set. For example, if the target segment is customers that are likely to purchase a product from a store, households in the seed data set that purchase products from the store 1× week may be assigned a greater importance than households that only purchase products from the store 1× month. If the seed data received by the processor 114 indicates importance rankings associated with various households in the seed data, the processor 114 may generate a weighting that increases the importance of the "high" and "medium" importance seed households. This weighting may be utilized by the processor 114 when determining unknown households that likely belong to the target segment.

Figure 8:
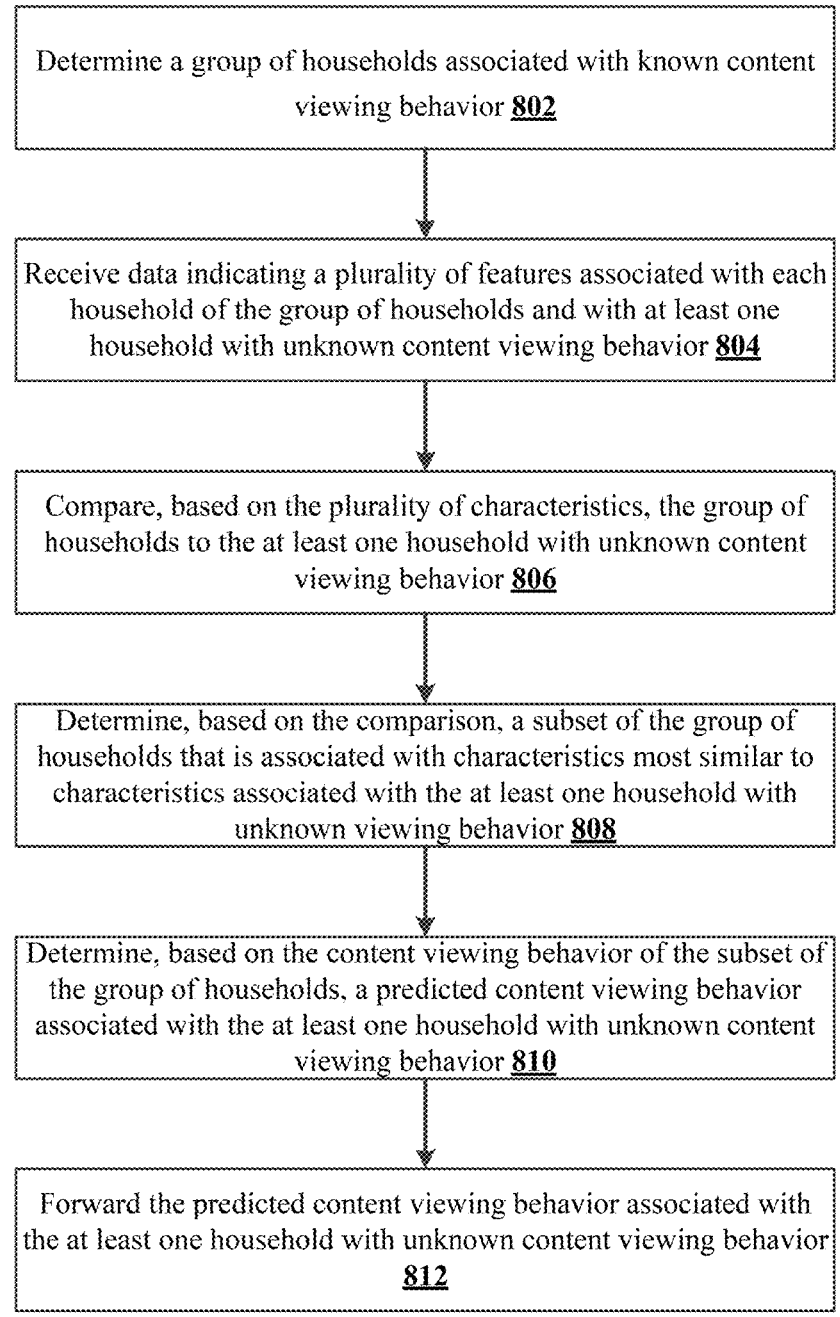
FIG. 8 shows an example method.

FIG. 8 shows an example method 800 for classifying households. The method may be performed, for example, by a processor (e.g. a processor 114). The method 800 may be performed to determine segmentation information associated with unknown households. For example, the method 800 may be performed to determine one or more content viewing behavior segments (or any other type of household segment) to which unknown households belong. Content viewing behavior segments may include, for example, a linear segment, a non-linear segment, a segment associated with a particular genre, and/or a segment associated with viewership of a supplemental content item. Households belonging to a particular content viewing behavior segment may exhibit the content viewing behavior associated with the segment. For example, a household belonging to the linear segment may consume linear content.

The segmentation information determined by the method 800 may be used, such as by advertiser(s), to select appropriate addressable (e.g. targeted) supplemental content for the unknown households. Accordingly, performance of the method 800 may ensure that a larger portion of end-consumers are actually interested in viewing the supplemental content that is served to them.

To determine segmentation information associated with at least one unknown household, information associated with known households may be utilized. For example, to determine one or more content viewing segments to which at least one unknown household belongs, content viewing information associated with known households may be utilized. At 802, a group of known households may be determined. Each of these known households may be associated with content viewing information. For example, each of these known households may be associated with information indicating a type of content primarily consumed by that household. The type of content may include, but is not limited to, linear content, non-linear content, a particular genre of content, and/or a supplemental content item associated with an ad campaign.

Each of these known households may additionally, or alternatively, be associated with information indicating a quantity of time that that household has spent viewing one or more types of content. For example, each of these known households may be associated with information indicating a quantity of time that the household has spent watching one or more of linear content, non-linear content, a particular genre of content, or a supplemental content item associated with an ad campaign. The group of households may be determined by receiving the group of households from an entity that collects or maintains the content viewership information, associated with these households, such as the content provider(s) 102.

Data associated with the group of known households may be compared with data associated with at least one unknown household. The comparison may be made to determine which known households are most similar to at least one unknown household. The data associated with the group of known households and the data associated with the at least one unknown household may be received from a third party (e.g. the marketing service provider 108). The data may be indicative of features (i.e., characteristics) associated with the known households and the unknown household(s). At 804, data indicating a plurality of features (i.e., characteristics) associated with each known household and the at least one unknown household may be received. For example, as described above with reference to FIG. 2, the data may be indicative of dwelling type, activities/behavior, geography, net worth, ethnicity, etc.

At 806, each of the known households may be compared to the at least one unknown household. To compare each of the known households to the at least one unknown household, the data associated with the group of known households may be compared to the data associated with the at least one unknown household. To compare the data associated with the group of known households with the data associated with the at least one unknown household, a similarity between the features (i.e., characteristics) associated with each of the known households and the features (i.e., characteristics) associated with at least one unknown household may be determined. The similarity may be, for example, a distance (e.g. Euclidean distance, cosine similarity distance), with a smaller distance between features indicative of a greater similarity.

Based on the comparison, a plurality of known households that are most similar (feature-wise) to the at least one unknown household may be determined. At 808, a subset of the group of known households may be determined. The subset of the group of known households may include those known households that are most similar to the at least one unknown household, based on the similarity between features (i.e., characteristics). For example, the subset of the group of known households may include those household associated with features (i.e., characteristics) that are the smallest distance away from the features (i.e., characteristics) associated with the at least one unknown household. The subset of the group of known households may include any number of households, such as the twenty (or another any number) known households that are most similar, feature-wise, to the at least one unknown household. For example, the subset of the group of known households may include those known households that are the most similar in terms of dwelling type, activities/behavior, geography, net worth, and/or ethnicity to the at least one unknown household.

One or more predicted segments to which the at least one household belongs may be determined based on the subset of known households. At 810, at least one predicted segment, such as a content viewing segment, associated with the at least one unknown household may be determined based on the content viewing information associated with the subset of known households. The predicted segment(s) may indicate whether the at least one household consumes primarily linear content or non-linear content, whether the at least one household consumes a significant portion of content associated with a particular genre, and/or whether the at least one household has consumed supplemental content item(s) associated with an ad campaign.

To determine the predicted segment(s) associated with the at least one unknown household, an average of the known content viewing behavior of the subset of known households may be determined. For example, if the known content viewing behavior of the subset of known households is indicative a quantity of time that each household of the subset of known households has spent viewing a particular type of content, then an average of the quantity of time that each household of the subset of known households has spent viewing the particular type of content may be determined. A predicted content viewing behavior may be equal to or based on the average of the known content viewing behavior of the subset of known households. For example, a predicted amount of time that the at least one unknown household has spent watching linear content may be equal to or based on the average of the amount of known linear content viewing of the subset of households. The predicted content viewing behavior may be used to determine the predicted segment(s). For example, if the predicted viewing behavior indicates that the at least one unknown household consumes primarily linear content, the at least one unknown household may belong to a linear segment.

However, as discussed above, even after determining the subset of known households that resemble (feature-wise) the at least one unknown household, a "zero-exposure" issue still exists for known households for which content viewing data is only available for one device. Accordingly, predicting the one or more segments to which the at least one household belongs may comprise remedying the "zero-exposure" issue.

Weighting by device may remedy this "zero-exposure issue." Weights for the devices in the known households may be determined using known, national household data. For example, the known, national household data may indicate which percentage of households in the country own one device, which percentage of households in the country own two devices, and which percentage of households in the country own three or more devices. This national data may be used to generate a weight that increases the importance of the two and three plus device households in the known household data so that it more closely resembles the national data.

The generated weights may be applied to the known households. For example, as shown in FIG. 4, a weight of 0.3 may be applied to the known households associated with a single device, a weight of 3.24 may be applied to the known households associated with two devices, and a weight of 26.42 may be applied to the known households associated with three or more devices, thereby increasing the importance of the two and three plus device households in the known household data. Applying the weights to the known household data may generate a supplemental content item exposure level that is more accurate than if the weighting process is not performed.

As also described above, weighting alone may solve the zero-exposure issue if content viewing behavior associated with the known households were only being used to determine aggregate reach numbers associated with a supplemental content item. However, it may be desirable to determine more than just aggregate reach numbers associated with an ad campaign. For example, may also be desirable to determine, based on the subset of known households, how much content of a particular type (e.g. linear, non-linear, genre, etc.) that the at least one unknown household likely consumes. To make such a determination, it may need to be determined, at a household level, how much of that type of content each known household likely consumes.

However, this may be difficult to determine due to an imbalance in the content viewing behavior data associated with the known households as compared to a national average. For example, the STB data 105*a* collected and stored by the content provider 102 may indicate that only 3% of households are broadcast content consumers and the smart TV data 105*b* collected and stored by the content provider 102 may indicate that 22% of households are broadcast content consumers. However, the true national number may be 14% (e.g. 14% of households in the country are broadcast content consumers). Accordingly, predicting the one or more segments to which the at least one household belongs may comprise remedying this imbalance in the content viewing behavior data associated with the known households (e.g. data including the STB data 105*a* and the smart TV data 105*b*). Remedying this imbalance may comprise calibrating the content viewing behavior data associated with the known households so that it is in line with the national content viewing behavior data.

To calibrate the content viewing behavior data associated with the known households, known households with one known device may be assigned to multiple device categories in alignment with the national distribution. Two and three plus device known households may stay static (assume there are no more devices within these households). One device known households may be randomly assigned to a number of projected devices (1, 2 or 3+) to match the national population. If the number of projected devices is higher than the number of actual devices, a portion of devices may be randomly assigned from zero-exposure to non-zero exposure. This new non-zero population and all other levels of supplemental content exposure may be scaled to whole numbers using the assigned number of devices.

An advertiser may utilize the predicted segment(s) associated with the at least one unknown household to determine addressable (e.g. targeted) supplemental content for the at least one unknown household. At 812, data indicative of the predicted segment(s) associated with the at least one unknown household may be forwarded, such as to an advertiser or any other party, entity, or device.

The predicted segment(s) may indicate, for example, that the unknown household consumes primarily linear content, non-linear content, a particular genre of content, and/or one or more supplemental content items (such as advertisements associated with an ad campaign). If an unknown household consumes primarily linear content, then an advertiser may serve a linear addressable supplemental content item to that household. Conversely, if an unknown household consumes primarily non-linear content, then the advertiser may serve a non-linear addressable supplemental content item to that household. If the unknown household consumes a significant amount of content associated with the comedy genre, then the advertiser may serve an addressable supplemental content item, selected based on the genre, to this household. If the unknown household has already consumed several supplemental content items associated with an ad campaign, then the advertiser may choose not to serve any more supplemental content items associated with the ad campaign to this household.

Figure 9:
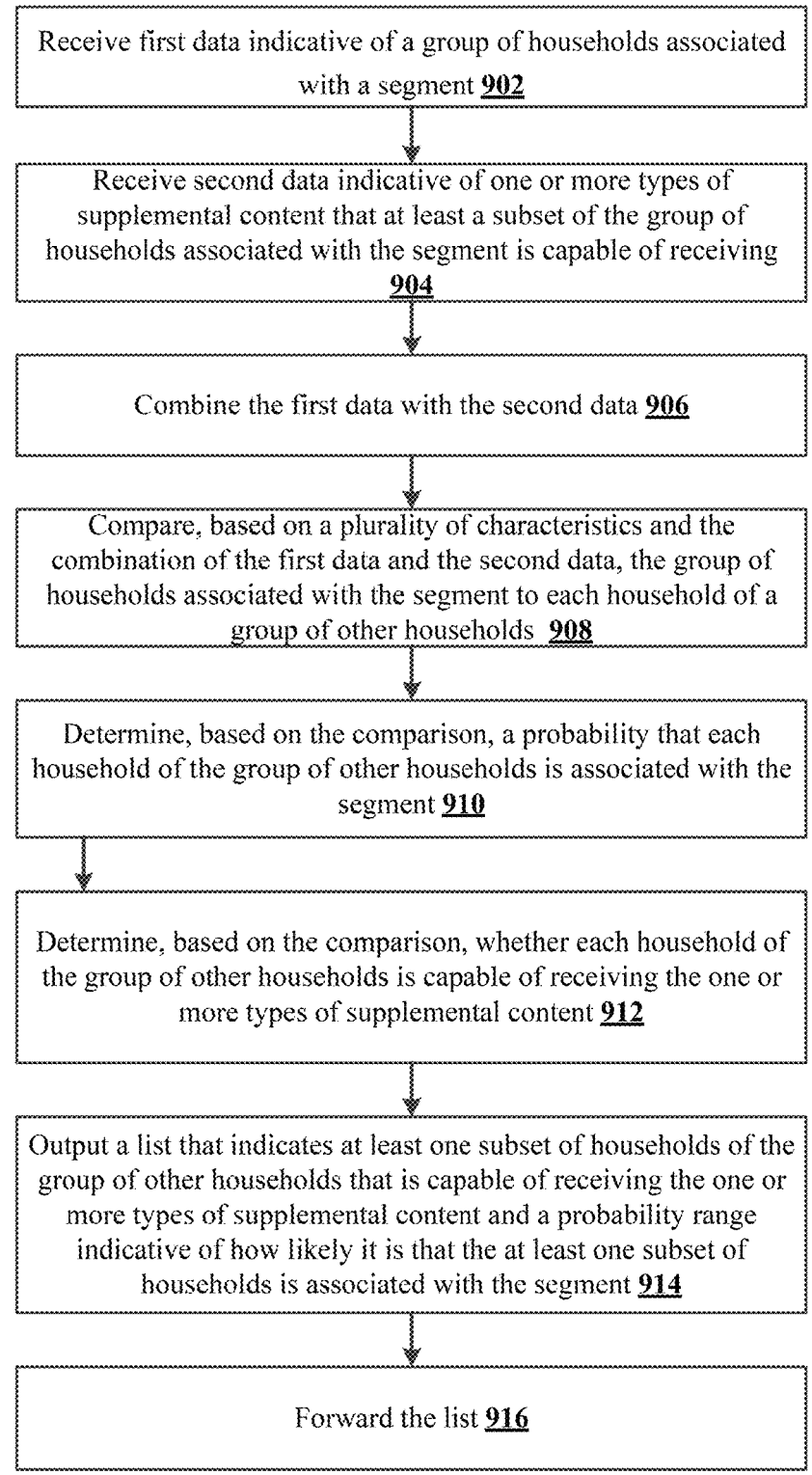
FIG. 9 shows an example method.

FIG. 9 shows an example method 900 for classifying households. The method may be performed, for example, by a processor (e.g. a processor 114). The method 900 may be performed to predict segmentation information associated with households for which actual segmentation data is unavailable (e.g. "unknown households"). For example, the method 900 may be performed to determine a probability that one or more unknown households belong to a target segment. The target segment may be any household segment that an entity (e.g. an advertiser, vendor, etc.) has identified. The entity may want to identify a large number of households that belong to the target segment. Accordingly, the entity may want to identify unknown households that belong to the target segment.

To determine unknown households that belong to the target segment, information associated with known households may be utilized. For example, to determine one or more content viewing segments to which at least one unknown household belongs, a seed data set indicative of a group of households that are known to belong to the target segment may be utilized. At 902, the seed data may be received. The seed data may be received from any third-party or vendor, such as from an advertiser. The seed data set may indicate a group of households that each belong to a particular target segment. The target segment may be any household segment that the third-party (e.g. the advertiser) wants to target. The advertiser may want to identify additional unknown households that belong to the target segment. The additional unknown households may be unknown households in a particular geographic region, or they may be any unknown national household. For example, the seed data may indicate a group of households that are heavy mobile users, and the advertiser may want to identify other unknown households that are also heavy mobile users. Identifying other unknown households that fit into the target segment may allow the advertiser to serve supplemental content associated with the target segment to a large number of households-thus increasing the reach of a particular ad campaign.

At 904, data associated with known households (e.g. subscriber data) may be received. The subscriber data may be received from any entity or party that collects or maintains data associated with known households, such as from the content provider 102. For example, the subscriber data may comprise the data stored in the subscriber database 106. As discussed above, the subscriber data may indicate whether a known household subscribes to (and is therefore capable of receiving) a particular type of content (e.g. linear content, VOD content, etc.).

At 906, the seed data and the subscriber data may be combined (e.g. merged). The seed data may be merged with the subscriber data so that it is possible to determine which households in the seed data set are known households (e.g. which seed households are associated with subscriber data), and which type(s) of content these known seed households are capable of receiving. It is important to merge the seed data with the subscriber data so that it may be determined whether an unknown household is capable of receiving a particular type of content. For example, if the seed data indicates a group of households that are heavy mobile users and the advertiser wants to identify other unknown households that are also heavy mobile users so that they can serve a linear addressable supplemental content item to these unknown households, it is important to be able to determine which unknown households are actually capable of receiving linear addressable content.

The merged data (e.g. the combination of the seed data and the subscriber data) may be compared with data associated with a group of unknown households. The comparison may be made to determine which unknown households are most similar to the households in the merged dataset. Data associated with the households in the merged data set and the data associated with the unknown households may be received from a third party (e.g. the marketing service provider 108). The data may be indicative of features (i.e., characteristics) associated with the households in the merged data set and each unknown household. Data indicating a plurality of features (i.e., characteristics) associated with each household in the merged data set and each unknown household may be received. For example, as described above with reference to FIG. 6, the data may be indicative of household composition, geography, income, occupation, and/or discretionary spending.

At 908, each of the unknown households may be compared to the households in the merged dataset. To compare each of the unknown households may be compared to the households in the merged dataset, the data associated with each of the unknown households may be compared to the data associated with the households in the merged dataset. To compare the data associated with each of the unknown households to the data associated with the households in the merged dataset, a similarity between the features (i.e., characteristics) associated with each unknown households and the features (i.e., characteristics) associated with the households in the merged dataset may be determined. The similarity may be, for example, a distance (e.g. Euclidean distance, cosine similarity distance), with a smaller distance between features indicative of a greater similarity.

At 910, a probability that each unknown household is associated with the target segment may be determined. The probability may be determined based on the comparison. For example, the probability that each unknown household is associated with the target segment may be determined based on the similarity between the features (i.e., characteristics) associated with that unknown households and the features (i.e., characteristics) associated with the households in the merged dataset. A higher probability may be determined for unknown households that are associated with features (i.e., characteristics) that are more similar (e.g. closer in distance) to the features (i.e., characteristics) associated with the households in the merged dataset. Likewise, a lower probability may be determined for unknown households that are associated with features that are less similar (e.g. further apart in distance) to the features (i.e., characteristics) associated with the households in the merged dataset.

For example, a higher probability may be determined for unknown households that are more similar in terms of dwelling type, activities/behavior, geography, net worth, and/or ethnicity to the households in the merged dataset. Similarly, a lower probability may be determined for unknown households that are less similar in terms of dwelling type, activities/behavior, geography, net worth, and/or ethnicity to the households in the merged dataset. However, as discussed above, different features (i.e., characteristics) may be used in comparison depending on the target segment.

At 912, it may be determined whether each unknown household is capable of receiving one or more types of supplemental content. It may be determined whether each unknown household is capable of receiving one or more types of supplemental content based on the comparison. As discussed above, the seed data may be merged with the subscriber data so that it is possible to determine which households in the seed data set are known households (e.g. which seed households are associated with subscriber data), and which type(s) of content these known seed households are capable of receiving. The one or more types of supplemental content may include, for example, linear content or VOD content.

At 914, a list may be generated and/or output. The list may indicate at least one subset of the unknown households and a probability/probability range indicative of how likely it is that each household of the at least one subset of households is associated with the target segment. For example, one or more lists may be generated and/or output for one or more ventile criteria. For example, one or more of a list of the top 95%-100% unknown households, a list of the top 90%-100% unknown households, a list of the top 85%-100% unknown households, a list of the top 80%-100% unknown households, a list of the top 75%-100% households, etc. may be generated and/or output. For example, the list of the top 95%-100% unknown households may include those unknown households that have the highest probabilities of belonging to the target segment, as compared to the other unknown households.

The list may indicate whether each unknown household in the subset is capable of receiving one or more types of supplemental content. For example, the list may indicate only those households in the subset that are capable of receiving a target type of supplemental content. Alternatively, the list may indicate one or more type(s) of supplemental content that each household in the subset is capable of receiving. At 916, the list may be forwarded. For example, the list may be forwarded to an advertiser. The advertiser may use the information contained in the list to gain a better insight into the potential reach of an ad campaign and/or viewership interest.

Optionally, the seed data received at 902 may indicate important rankings associated with various households in the seed data. For example, the entity (such as the advertiser) that generated the seed data may have assigned a "high", "medium," or "low" importance to each household in the seed data set. For example, if the target segment is customers that are likely to purchase a product from a store, households in the seed data set that purchase products from the store 1× week may be assigned a greater importance than households that only purchase products from the store 1× month. If the received seed data indicates importance rankings associated with various households in the seed data, a weighting that increases the importance of the "high" and "medium" importance seed households may be generated. This weighting may be utilized when determining unknown households that likely belong to the target segment.

Figure 10:
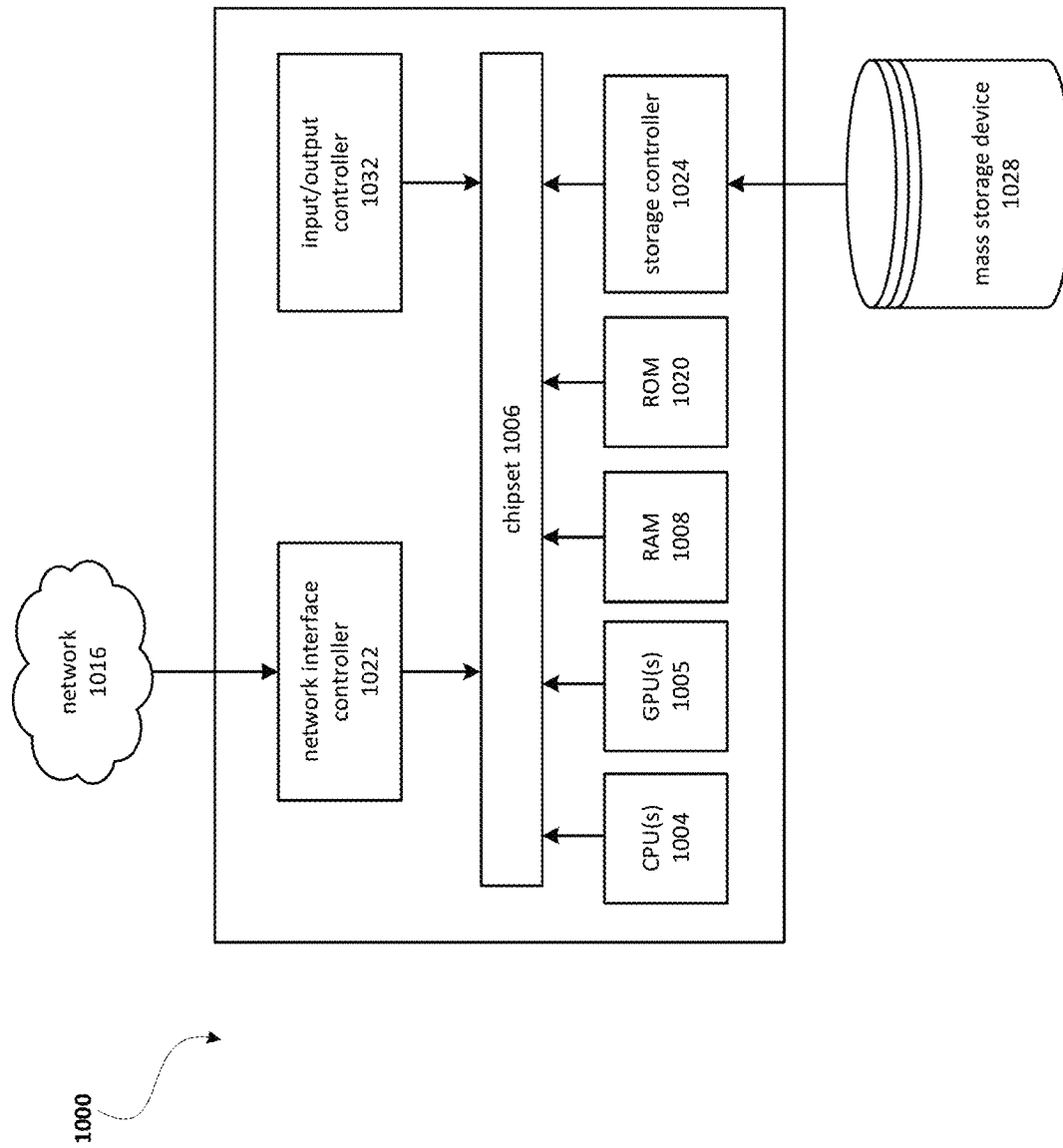
FIG. 10 shows an example computing system.

FIG. 10 shows an example computing device 1000 that may represent any of the various devices or entities shown in FIG. 1, including, for example, the content provider(s) 102, the marketing service provider 108, the supplemental data source(s) 112, the advertiser 116, or the processor 114. That is, the computing device 1000 shown in FIG. 10 may be any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIG. 1 or any of the methods described in relation to FIGS. 8-9.

The computing device 1000 may include a baseboard, or "motherboard," which is a printed circuit board to which a multitude of components or devices may be connected by way of a system bus or other electrical communication paths. One or more central processing units (CPUs or "processors") 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems of the system 100. The chipset 1006 may include functionality for providing network connectivity through a network interface controller (NIC) 1022. A NIC 1022 may be capable of connecting the computing device 1000 to other computing nodes over the system 100. It should be appreciated that multiple NICs 1022 may be present in the computing device 1000, connecting the computing device to other types of networks and remote computer systems. The NIC may be configured to implement a wired local area network technology, such as IEEE 802.3 ("Ethernet") or the like. The NIC may also comprise any suitable wireless network interface controller capable of wirelessly connecting and communicating with other devices or computing nodes on the system 100. For example, the NIC 1022 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 1000 may be connected to a mass storage device 1028 that provides non-volatile storage (i.e., memory) for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may read information from the mass storage device 1028 by detecting the physical states or characteristics of one or more particular locations within the physical storage units.

In addition to the mass storage device 1028 described herein, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described herein. The computing device 1000 may have access to computer-readable storage media storing computer-executable instructions, which, when executed by the computing device 1000, may perform the methods described in relation to FIGS. 8-9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey data indicating a preferred or ideal embodiment. "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   determining a group of households associated with known content viewing behavior;
   comparing, based on a plurality of characteristics associated with the group of households, the group of households to at least one household with unknown content viewing behavior;
   determining, based on the comparison, a subset of the group of households that is associated with characteristics most similar to characteristics associated with the at least one household with unknown viewing behavior; and
   determining, based on the known content viewing behavior of the subset of the group of households, a predicted content viewing behavior associated with the at least one household with unknown content viewing behavior.

2. The method of claim 1, further comprising:
   forwarding the predicted content viewing behavior associated with the at least one household with unknown content viewing behavior.

3. The method of claim 1, wherein determining the group of households associated with the known content viewing behavior comprises:
   receiving data indicating the known content viewing behavior associated with the group of households.

4. The method of claim 1, further comprising:
   receiving first data indicating the plurality of characteristics associated with each household of the group of households and second data indicating the plurality of characteristics associated with the at least one household with unknown content viewing behavior, and wherein comparing, based on the plurality of characteristics, the group of households to the at least one household with unknown content viewing behavior comprises:
   comparing the first data to the second data.

5. The method of claim 1, determining, based on the comparison, a subset of the group of households that is associated with characteristics most similar to characteristics associated with the at least one household with unknown viewing behavior comprises:
   determining a distance between characteristics associated with each household of the group of households and characteristics associated with the at least one household with unknown viewing behavior.

6. The method of claim 5, wherein the distance is at least one of a Euclidean distance or a cosine similarity distance.

7. The method of claim 1, wherein determining, based on the known content viewing behavior of the subset of the group of households, the predicted content viewing behavior associated with the at least one household with unknown content viewing behavior comprises:
   determining an average of the known content viewing behavior of the subset of households.

8. The method of claim 7, wherein the known content viewing behavior of the subset of the group of households is indicative of a quantity of time that each household of the subset of the group of households has spent viewing a particular type of content, and wherein determining the average of the content viewing behavior of the subset of households comprises:
   determining an average of the quantity of time that each household of the subset of the group of households has spent viewing the particular type of content.

9. The method of claim 1, wherein determining, based on the content viewing behavior of the subset of the group of households, the predicted content viewing behavior associated with the at least one household with unknown content viewing behavior comprises:
   determining, based on a quantity of devices associated with each household of the group of households and a known national distribution of quantity of devices per household, a weight associated with each household of the subset of the group of households.

10. The method of claim 8, wherein determining, based on the content viewing behavior of the subset of the group of households, the predicted content viewing behavior associated with the at least one household with unknown content viewing behavior comprises:
    determining, based on the weight associated with each household of the subset of the group of households, a weighted average of the content viewing behavior of the subset of households.

11. The method of claim 1, wherein determining, based on the content viewing behavior of the subset of the group of households, the predicted content viewing behavior associated with the at least one household with unknown content viewing behavior comprises:
- comparing a distribution of quantity of devices associated with each household of the group of households to a known national distribution of quantity of devices per household; and
- adjusting the distribution of quantity of devices associated with each household of the group of households so that it corresponds to the known national distribution of quantity of devices per household.

12. The method of claim 1, wherein the content viewing behavior comprises at least one of linear content viewing, non-linear content viewing, broadband viewing, managed provider-type viewing, viewing of a particular genre of content, exposure to a supplemental content item, or non-exposure to a supplemental content item.

13. The method of claim 1, wherein the plurality of characteristics comprises at least one of dwelling type, ethnicity, geography, net worth, household composition, discretionary spending, occupation, geography, or income.

14. A method comprising:
- receiving data indicative of a group of households associated with a content viewing behavior segment;
- comparing, based on a plurality of characteristics associated with the group of households associated with the content viewing behavior segment, the group of households associated with the content viewing behavior segment to each household of a group of other households with unknown content viewing behavior; and
- determining, based on the comparison, a probability that each household of the group of other households is associated with the content viewing behavior segment.

15. The method of claim 14, further comprising:
- outputting a list that indicates at least one subset of households of the group of other households and a probability range indicative of how likely it is that the at least one subset of households is associated with the content viewing behavior segment.

16. The method of claim 15, further comprising:
- forwarding the list that indicates at least one subset of households of the group of other households and the probability range indicative of how likely it is that the at least one subset of households is associated with the content viewing behavior segment.

17. The method of claim 15, further comprising:
- receiving data indicative of one or more types of supplemental content that at least a subset of the group of households associated with the content viewing behavior segment is capable of receiving.

18. The method of claim 17, further comprising:
- determining, based at least on the data indicative of one or more types of supplemental content that at least the subset of the group of households associated with the content viewing behavior segment is capable of receiving, whether each household of the group of other households is capable of receiving the one or more types of supplemental content.

19. The method of claim 14, wherein receiving the data indicative of the group of households associated with the content viewing behavior segment comprises at least one of:
- receiving an indication that a first portion of the group of households associated with the segment is associated with a high level of importance;
- receiving an indication that a second portion of the group of households associated with the segment is associated with a medium level of importance; or
- receiving an indication that a third portion of the group of households associated with the segment is associated with a low level of importance.

20. The method of claim 19, further comprising:
- determining, based on whether each household is in the first portion, second portion, or third portion of households associated with the segment, a weight associated with each household of the group of households associated with the content viewing behavior segment, and wherein determining, based on the comparison, the probability that each household of the group of other households is associated with the content viewing behavior segment comprises:
- determining, based on the weight associated with each household of the group of households associated with the segment, the probability that each household of the group of other households is associated with the content viewing behavior segment.

* * * * *